(12) United States Patent
Bui

(10) Patent No.: US 8,245,182 B2
(45) Date of Patent: Aug. 14, 2012

(54) CLASS SELECTABLE DESIGN SHARING

(75) Inventor: Dao Hung Bui, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 1120 days.

(21) Appl. No.: 12/102,290

(22) Filed: Apr. 14, 2008

(65) Prior Publication Data

US 2009/0259986 A1 Oct. 15, 2009

(51) Int. Cl.
*G06F 9/44* (2006.01)

(52) U.S. Cl. .......... 717/104; 717/100

(58) Field of Classification Search ......... 717/104–105
See application file for complete search history.

(56) References Cited

U.S. PATENT DOCUMENTS

| | | | |
|---|---|---|---|
| 5,526,517 A * | 6/1996 | Jones et al. | 707/999.008 |
| 5,802,527 A | 9/1998 | Brechtel et al. | |
| 6,199,195 B1 | 3/2001 | Goodwin et al. | |
| 6,253,366 B1 * | 6/2001 | Mutschler, III | 717/104 |
| 6,292,932 B1 * | 9/2001 | Baisley et al. | 717/114 |
| 6,327,698 B1 * | 12/2001 | Kolluru | 717/104 |
| 6,665,677 B1 * | 12/2003 | Wotring et al. | 1/1 |
| 6,804,686 B1 * | 10/2004 | Stone et al. | 1/1 |
| 6,874,146 B1 * | 3/2005 | Iyengar | 719/313 |
| 7,069,554 B1 * | 6/2006 | Stammers et al. | 717/178 |
| 7,152,228 B2 | 12/2006 | Goodwin et al. | |
| 7,269,823 B2 * | 9/2007 | Szyperski | 717/123 |
| 2005/0149914 A1 * | 7/2005 | Krapf et al. | 717/136 |
| 2006/0130034 A1 * | 6/2006 | Beisiegel et al. | 717/166 |
| 2007/0168921 A1 * | 7/2007 | Bailleul et al. | 717/104 |

OTHER PUBLICATIONS

"Addin-Development for Rational Rose", Research Disclosure, Feb. 2003, pp. 320-321.
Clarke et al., "Reveal: A Tool to Reverse Engineer Class Diagrams", 40th International Conference on Technology of Object-Oriented Languages and Systems, Conferences in Research and Practice in Information Technology, 2002, pp. 13-21, vol. 10, Australian Computer Society, Inc., Sydney, Australia.
Medvidovic et al., "Modeling Software Architectures in the Unified Modeling Language", ACM Transactions on Software Engineering and Methodology, Jan. 2002, pp. 2-57, vol. 11, No. 1.
Doucet et al., "YAML: A Tool for Hardware Design Visualization and Capture", 2000, pp. 9-14, Center for Embedded Computer Systems, University of California, Irvine, Advanced Technology Group, Synopsys Inc. Mountain View.
Egyed, "Automated Abstraction of Class Diagrams", ACM Transactions on Software Engineering and Methodology, Oct. 2002, pp. 449-491, vol. 11, No. 4, New York, New York, USA.

* cited by examiner

*Primary Examiner* — Hung T Vy
*Assistant Examiner* — Mongbao Nguyen
(74) *Attorney, Agent, or Firm* — Yee & Associates, P.C.; Steven L. Bennett

(57) ABSTRACT

A computer implemented method for class selectable design sharing obtains a set of classes for a design model from a source system, and identifies desired classes from the set of classes to form an identified subset of classes. The computer implemented method further exports the identified subset of classes from the design model of the source system to a design model of a target system.

12 Claims, 3 Drawing Sheets

CLASS SELECTABLE DESIGN SHARING

BACKGROUND OF THE INVENTION

1. Field of the Invention

The present invention relates generally to an improved data processing system and more specifically to a computer implemented method, an apparatus, and a computer program product for a class selectable design sharing.

2. Description of the Related Art

Frequently, there are multiple designers working on the same software design using a design modeling tool. A typical limitation of such modeling tools is that the classes associated with a particular design are difficult to port and share among different design models. Typical design tools allow designers to export the whole design, comprising all of the classes associated with the design, as a package. Importing of the previously exported package causes the receiving system to then overwrite all existing classes that are in the receiving model by the new classes being imported.

For example, when a designer adds a new class in a model and a colleague wants to work with the class in a corresponding model, there appears to be no effective way to do so. The receiving designer has no effective means to import this new class into a model to continue synchronously with the design. The typical response is to add in the class by manually typing in the class name, attributes & methods. This can be extremely troublesome if the number of new classes added by one designer is large.

BRIEF SUMMARY OF THE INVENTION

According to one embodiment of the present invention, there is a computer implemented method for a class selectable design sharing. The computer implemented method comprises obtaining a set of classes for a design model from a source system, and identifying desired classes from the set of classes to form an identified subset of classes. The computer implemented method further exporting the identified subset of classes from the source system to a design model of a target system.

DETAILED DESCRIPTION OF THE INVENTION

Figure 1:
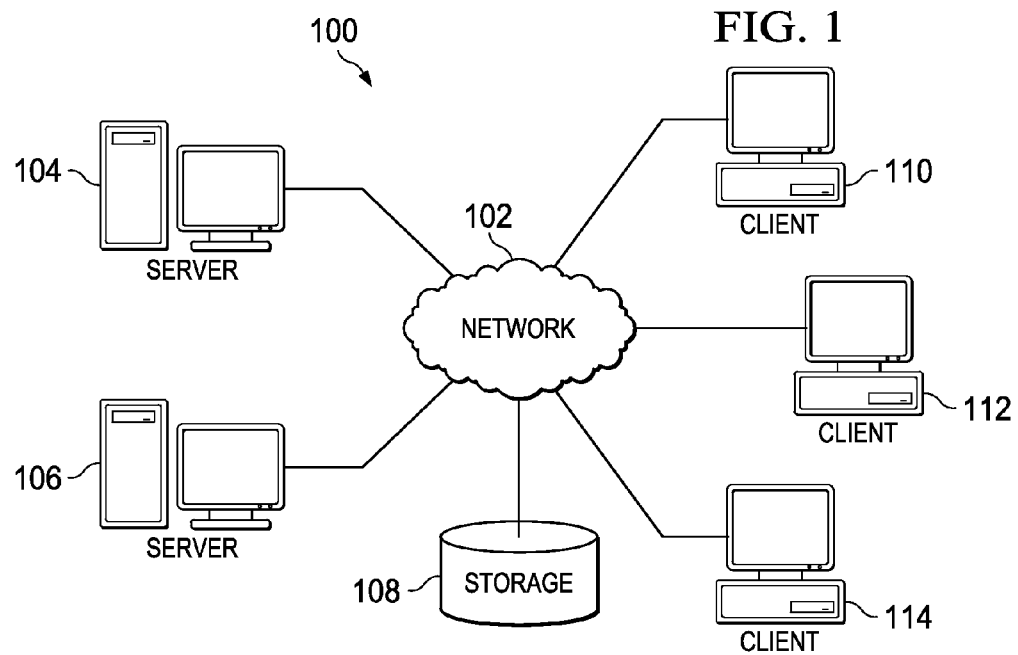
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package or partly on the user's computer and partly on a remote computer. In the latter scenario, the remote computer, storing the exported classes from the user's computer, may be connected to the user's computer through any type of network, including a local area network (LAN) or a wide area network (WAN), or the connection may be made to an external computer (for example, through the Internet using an Internet Service Provider). The program code may export the identified subset of classes from the source computer and then place it in a repository, such as a remote computer, in a network. Subsequently, the target computer can access the repository and import the previously exported classes into a design model on the target computer enabling sharing of the design code.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
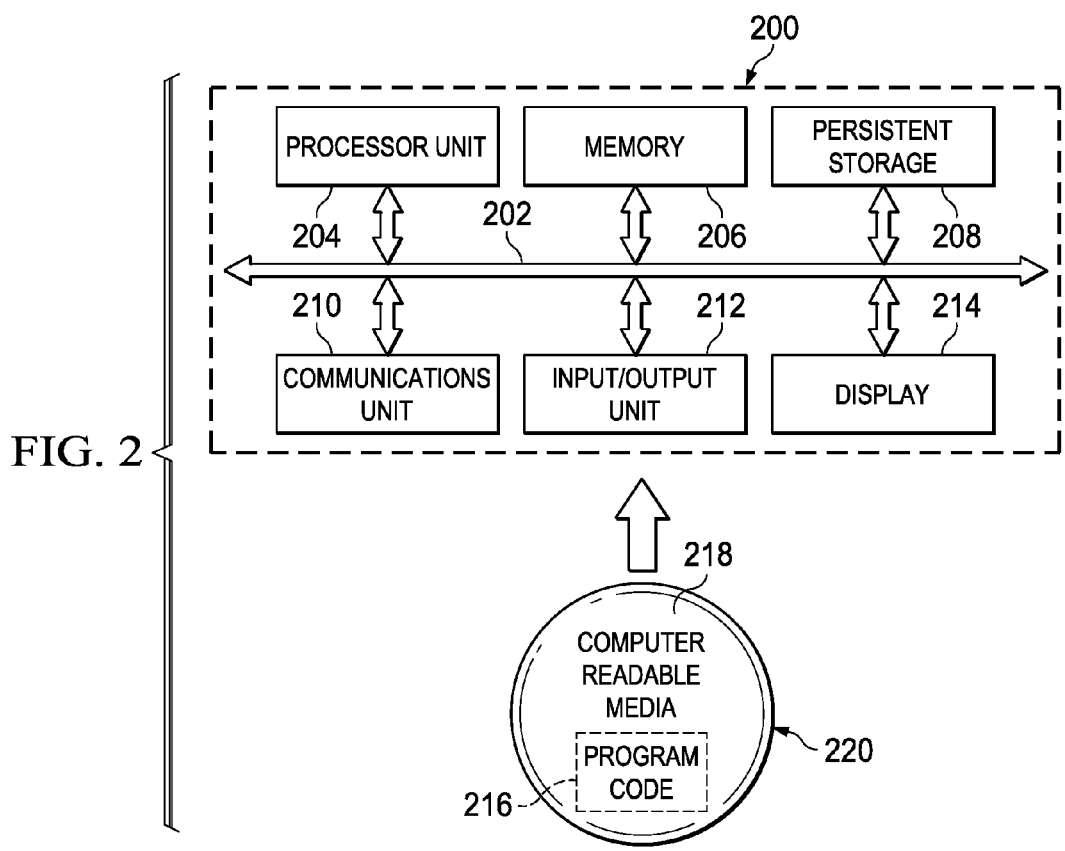
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

In one example, classes are allowed to be shared among different models so that multiple designers can work on the same design at the same time. A designer working on client 110 can "share" classes with another designer user on client 112 through network 102. The classes of a modeler on client 110 can be exported to a catalog file, individually or collectively to form a set of classes. The set of classes may reside on server 104 or a client. The other designer on client 112 can then import this catalog file containing the set of classes into their own models. The export capability allows classes from one model to be easily added to another model of the same without manually typing in all the names, attributes and methods of the classes selected. Model transforms are not performed therefore any differences between models will not be handled. In case there are classes being imported with the same names as existing classes, the importer will prompt a receiving user to determine whether the class is to replace an existing class.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
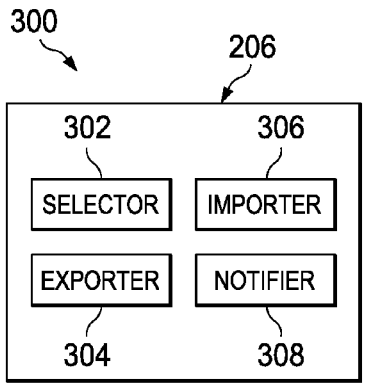
FIG. 3 is a block diagram of components of an export service, in accordance with illustrative embodiments.

With reference to FIG. 3, a block diagram of components of an export service, in accordance with illustrative embodiments is shown. The components of FIG. 3 are illustrative of the functional components of an export service for class selectable design sharing in accordance with illustrative embodiments. Other components in support of the components shown are presumed to be provided by the system or platform in which the export service operates.

Export service 300 contains a number of components comprising a selector 302, an exporter 304, an importer 306 and a notifier 308, shown within memory 206 of system 200 of FIG. 3 in this example. The components may reside in other storage locations prior to use.

Selector 302 provides a capability to obtain a set of classes from a design model referred to as a source model and allow for a selection to be made from the obtained set of classes. The selection may be one or more classes from the set of classes forming a subset of selected classes. The subset may be one or more classes.

Exporter 304 provides a capability for preparing the subset of selected classes for shipment from the source model to a target model. The target model is a design model into which the shipped set of classes is to be placed. Both the source model and the target model are instances of a design model. The exporter is in communication with networking functions on the platform to send the shipment to the target model on the same or different platform.

Importer 306 is the counterpart function of exporter 304. Importer 306 provides a capability of receiving a shipment from exporter 304. Importer 306 receives the content of the shipment into the target model. Importer 306 determines if a received class having a specific name already exists in the target model and provides an opportunity to resolve the duplication.

Notifier 308 provides a capability to respond to the determination that a duplicate class exists in the target model. Resolution occurs by choosing to overwrite the existing class of the same name or renaming of the received class. The notifier may prompt, as in the case of a user interaction, for a selected action of overwrite or rename. In the example of a programmatic import, a parametric response may be used to perform the same selected actions.

Figure 4:
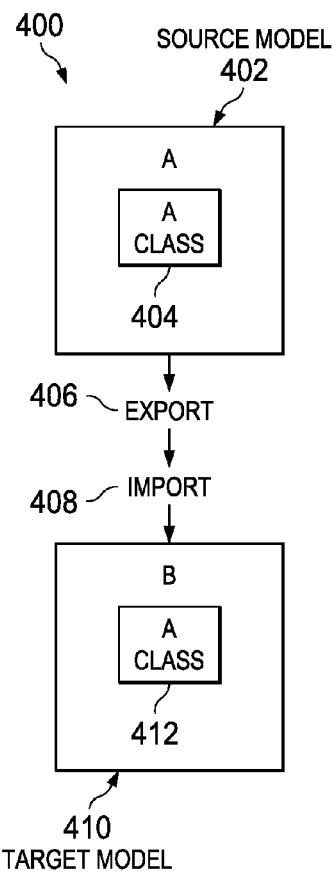
FIG. 4 is a block diagram of an overview of an export service, in accordance with illustrative embodiments.

With reference to FIG. 4, a block diagram of an overview of an export service for class selectable design sharing, in accordance with illustrative embodiments is shown. This high level example of export service 300 of FIG. 3 shows environment 400 in which source model 402 shares classes with target model 410. The sharing of classes is at the design phase or source level only therefore sharing occurs before any class execution occurs. Source model 402 contains a set of classes "A class." The set may contain one or more members wherein each member is a class.

A subset 404 of classes is identified from the set of classes. Subset 404 is itself a set of classes, comprising one or more classes. Subset 404 may also be the complete set. Once the subset has been determined, subset 404 is passed to the export 406 for shipment from source model 402 of system A to the target model 410 of system B. Export 406 may form the subset into a form suitable for shipping as required by the network.

Import 408, the receiving counterpart of export 406 receives the shipment into subset 412 of target model 410 on system B. While this example uses two systems, there may also be one or many systems, wherein system A and system B may also be on the same system but still comprising different source and target models.

Figure 5:
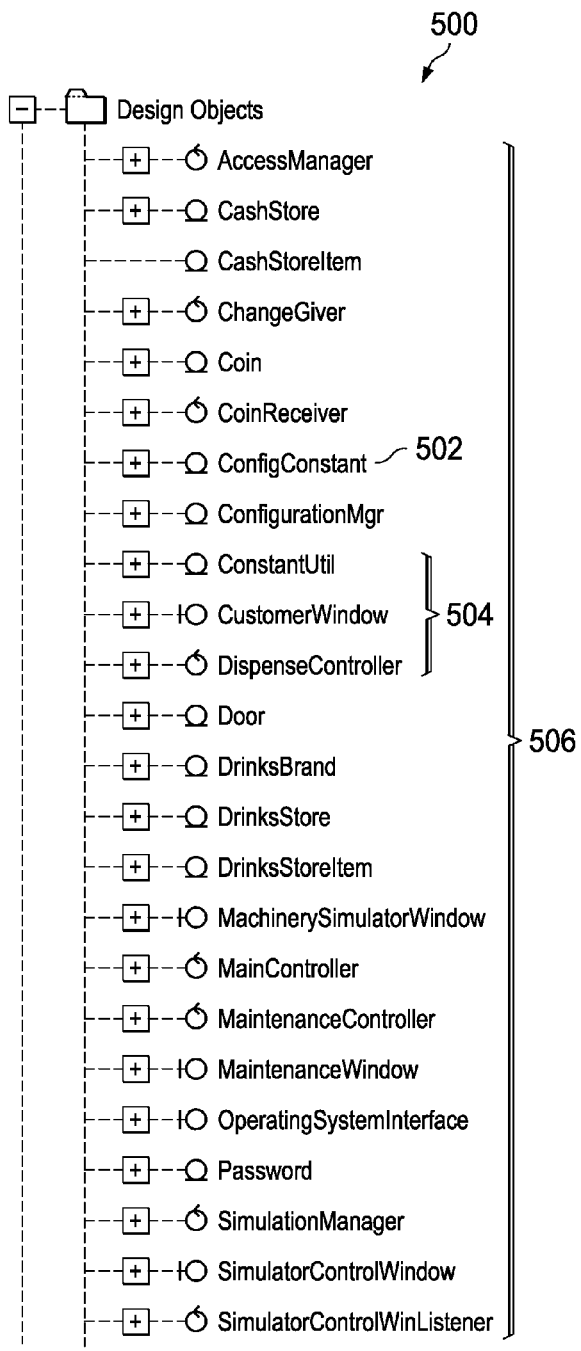
FIG. 5 is a listing of objects illustrative of the use of export service of FIG. 4, in accordance with illustrative embodiments.

With reference to FIG. 5 a listing of objects illustrative of the export service of FIG. 4, in accordance with illustrative embodiments is shown. List 500 is a listing of design objects related to a particular model. Set 506 represents all of the members available in the listing. Subset 502 represents the selection of a single member of set 506. Subset 504 represents three members of set 506. Each is a proper selection for an export service. The determination of which members is included in an export is now selective and not predetermined as before. A selection may therefore be one, some or all members of the set of classes of the source model.

Figure 6:
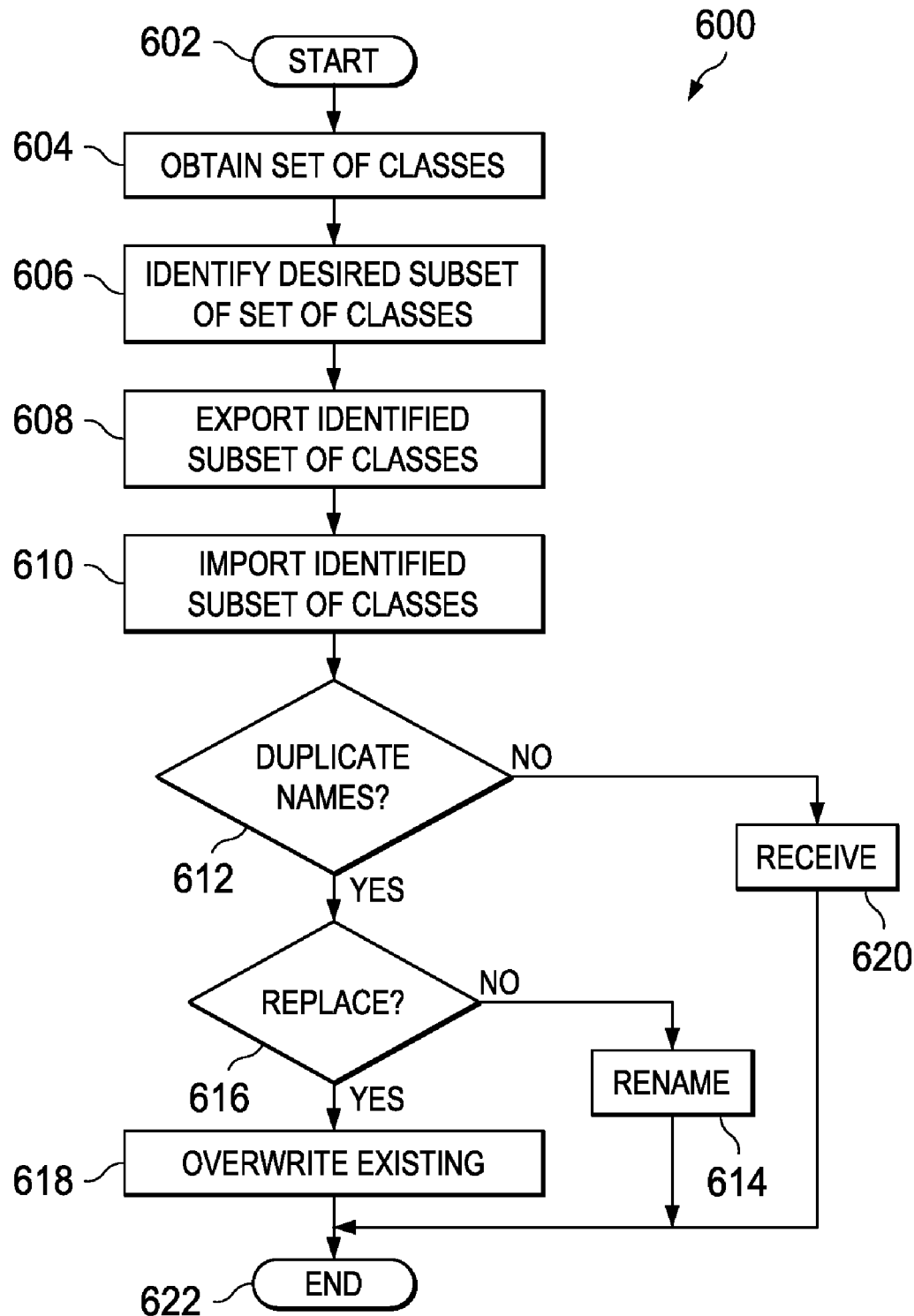
FIG. 6 is a flowchart of the export service of FIG. 4 in accordance with illustrative embodiments.

With reference to FIG. 6, a flowchart of the export service of FIG. 3 in accordance with illustrative embodiments is shown. Process 600 is an example of an export service 300 of FIG. 3, for class selectable design sharing.

Process 600 starts (step 602) and obtains a set of classes from the source model (step 604). Identify a desired subset of the set of classes creates an identified subset of classes for export (step 606). Export of the identified subset of classes from the source system occurs (step 608). Exporting may also requiring formatting for security or transmission requirements. Additional requirements are handled by system or platform services beyond the scope of the export service.

Importing the identified subset onto the target system occurs (step 610). Importing may use system services to reformat the shipment if the shipment was modified for security of transmission requirements. Importing receives the contents of the shipment into the target model.

Existence of duplicate names is determined (step 612). A prompt may be provided to a user to determine if duplicate names should be changed or overwritten. Duplicate names may occur when sharing classes. For example, a source modeler develops a class "A" and provides the class to a target modeler. The source modeler updates class "A" and send exports the update to the target modeler. The updated class "A" has the same name as the existing class name. When there are no duplicate names, a "no" results in step 612. When duplicate name exists, a "yes" is obtained in step 612.

When a "no" is obtained in step 612, the identified subset is received into the target model (step 620) and process 600 terminates thereafter (step 622). When a "yes" is obtained in step 612, a determination is made whether to replace the existing class of the same name (step 616). If a replace is selected a "yes" results. If a replace is not to occur a "no" results. When a "yes" is obtained in step 616, the class on the target system having the same name as the incoming class is overwritten by the received class (step 618) and process 600 terminates thereafter (step 622). When a "no" is obtained in step 616, a rename is performed on the incoming class (step 614). Process 600 terminates thereafter (step 622).

Illustrative embodiments provide a capability to select a subset of classes of a design class for export from a source model to a target model. Selective sub-setting avoids the need to send the whole design class to the target model. Selective sub-setting also avoids manual entry of the desired class information when only a subset of classes is required for export.

In an example a designer may share classes among different models of the design system. This sharing at the design stage provides design portability allowing different designers using different models to work together on the same design by importing and exporting common classes. Sharing of classes, in this example, focuses on the design phase, and not in implementation phase. In the example, classes in the design model can be exported to a ".cat" file, individually or collectively. Other designers can then import the ".cat" file into their own design models. In a case where there are exported classes with the same names as the existing classes, the proposed technique prompts the receiving user to determine if the existing file should be replaced. Using this example, classes from other design models can be easily added in another design model efficiently without manually typing in all the class names, attributes and methods.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for a class selectable design sharing, the computer implemented method comprising:
    obtaining a set of classes for a design model from a source system;
    identifying desired classes from the set of classes to form an identified subset of classes;
    exporting the identified subset of classes from the source system to a repository; and
        importing the identified subset of classes from the repository into another design model in a target system, wherein the another design model in the target system and the design model in the source system are different design models;
        wherein importing the identified subset of classes from the repository into the another design model in the target system further comprises:
            comparing a class name of each class in the identified subset of classes with a name of an existing class in the another design model in the target system;
            determining whether there is a duplicate class name between the identified subset of classes exported from the source system and a class name of an existing class in the another design model in the target system; and
            responsive to a determination that there is the duplicate class name, performing one of an overwrite operation and a rename of the duplicate class name in the identified subset of classes.

2. The computer implemented method of claim 1, wherein the identifying desired classes from the set of classes to form an identified subset of classes further comprises:
    selecting a set of classes from the set of classes of the design model, wherein the selected set of classes comprises one or more identified classes to form the identified subset of classes.

3. The computer implemented method of claim 1, wherein performing one of the overwrite operation and the rename of the duplicate class name in the identified subset of classes further comprises:
    notifying a user and prompting the user for a selected action from the overwrite operation and the rename of the duplicate class name in the identified subset of classes prior to performing the selected action.

4. The computer implemented method of claim 1 further comprising:
    responsive to a determination that there is no duplicate name, placing the identified subset of classes into the another design model in the target system.

5. A data processing system for a class selectable design sharing, the data processing system comprising:
    a bus;
    a memory connected to the bus, wherein the memory comprises computer executable instructions;
    a communications unit connected to the bus;
    a display;
    a processor unit connected to the bus, wherein the processor unit executes the computer executable instructions to direct the data processing system to:
obtain a set of classes for a design model from a source system;
    identify desired classes from the set of classes to form an identified subset of classes;
export the identified subset of classes from the source system to a repository; and
    import the identified subset of classes from the repository into another design model in a target system, wherein the another design model in the target system and the design model in the source system are different design models;
    wherein the computer executable instructions to direct the data processing to import the identified subset of classes from the repository into the another design model in the target system further comprise:
        computer executable instructions to direct the data processing system to compare a class name of each class in the identified subset of classes with a name of an existing class in the another design model in the target system;
        computer executable instructions to direct the data processing system to determine whether there is a duplicate class name between the identified subset of classes exported from the source system and a class name of an existing class in the another design model in the target system; and
        computer executable instructions to direct the data processing system to perform one of an overwrite operation and a rename of the duplicate class name in the identified subset of classes, responsive to a determination that there is the duplicate class name.

6. The data processing system of claim 5, wherein the computer executable instructions to direct the data processing system to identify desired classes further comprises:
    computer executable instructions to direct the data processing system to select a set of classes from the set of classes of the design model, wherein the selected set of classes comprises one or more identified classes to form the identified subset of classes.

7. The data processing system of claim 5, wherein the computer executable instructions to direct the data processing system to perform one of the overwrite operation and the rename of the duplicate class name in the identified subset of classes further comprises:

computer executable instructions to direct the data processing system to notify a user and prompt the user for a selected action from the overwrite operation and the rename of the duplicate class name in the identified subset of classes prior to performing the selected action.

8. The data processing system of claim 5, wherein the processor unit executes the computer executable instructions to direct the data processing system to place the identified subset of classes into the design model in the target system, responsive to a determination that there is no duplicate name.

9. A computer program product for a class selectable design sharing, the computer program product comprising:

a computer-readable tangible storage device embodying computer executable instructions thereon, the computer executable instructions comprising:

computer executable instructions for obtaining a set of classes for a design model from a source system;

computer executable instructions for identifying desired classes from the set of classes to form an identified subset of classes;

computer executable instructions for exporting the identified subset of classes from the source system to a repository; and importing the identified subset of classes from the repository into another design model in a target system, wherein the another design model in the target system and the design model in the source system are different design models;

wherein the computer executable instructions for importing the identified subset of classes from the repository into the another design model in the target system further comprises:

computer executable instructions for comparing a class name of each class in the identified subset of classes with a name of an existing class in the another design model in the target system;

computer executable instructions for determining whether there is a duplicate class name between the identified subset of classes exported from the source system and a class name of an existing class in the another design model in the target system; and computer executable instructions responsive to a determination that there is the duplicate class name, for performing one of an overwrite operation and a rename of the duplicate class name in the identified subset of classes.

10. The computer program product of claim 9, wherein the computer executable instructions for identifying desired classes from the set of classes to form an identified subset of classes further comprises:

computer executable instructions for selecting a set of classes from the set of classes of the design model, wherein the selected set of classes comprises one or more identified classes to form the identified subset of classes.

11. The computer program product of claim 9, wherein the computer executable instructions, for performing one of the overwrite operation and the rename of the duplicate class name in the identified subset of classes further comprises:

computer executable instructions for notifying a user and prompting the user for a selected action from the overwrite operation and the rename of the duplicate class name of the identified subset of classes prior to performing the action.

12. The computer program product of claim 9, further comprising:

computer executable instructions responsive to a determination that there is no duplicate name, for placing the identified subset of classes into the another design model in the target system.

\* \* \* \* \*